United States Patent Office 3,276,899

Patented Oct. 4, 1966

1

3,276,899

SUBSTRATE WITH A PRECOAT OF RESIN POLYMER AND STARCH GRANULES AND A TOPCOAT OF VINYLIDENE CHLORIDE RESIN

Lawrence H. Muhlberg, Union, Joseph A. Wray, Dunellen, and Robert W. Willis, Somerville, N.J., assignors to National Starch and Chemical Corporation, New York, N.Y., a corporation of Delaware No Drawing. Filed May 22, 1962, Ser. No. 196,588
5 Claims. (Cl. 117—76)

This invention relates to the manufacture of coated cellulosic substrates as well as to the coating compositions utilized for their preparation. More particularly, this invention relates to a method which allows for the increased utilization of vinylidene chloride coating resins.

It is the prime object of this invention to provide novel precoats for use in conjunction with vinylidene chloride coating resins. A further object of this invention involves the preparation of vinylidene chloride resin coated substrates which are characterized by their high degree of flexibility, crease resistance and scoreability. Another object involves the development of improved precoats for vinylidene chloride resins, said precoats serving to prevent the excessive and undesirable penetration of the latter resins into the thus coated substrates. A still further object of our invention involves the coating of substrates with non-blocking precoats which thereby permit the thus coated substrates to be readily handled prior to their being coated with vinylidene chloride resins. Various other objects and advantages of this invention will be apparent from the disclosure that follows hereinafter.

As is well known in the art, paper and other fibrous, cellulosic substrates are often coated with film forming synthetic resins in order to impart various properties which would permit their use under conditions wherein the uncoated substrates would ordinarily be inoperable. Certain desirable properties for such coated cellulosic substrates which are of particular interest to the practitioner include a very low degree of water vapor and gas permeability, a high degree of oil and grease resistance, a high degree of organic and inorganic solvent resistance and resistance to corrosive chemicals.

In order to be able to obtain coated cellulosic substrates with the above described properties, it has been found that the use of homo-, and more particularly of copolymers, of vinylidene chloride resulted in the preparation of coatings which exhibited a degree of chemical resistance, grease and oil resistance, along with water vapor and gas impermeability which far surpassed the results attainable with any other available class of protective coating resins.

However, in further developing the use of these resins as coatings for cellulosic substrates, a number of serious operational problems were encountered. One such problem was related to the fact that the films derived from these vinylidene chloride resins were relatively hard and inflexible so that the substrates coated with these resins could not be readily creased, folded or mechanically scored without cracking the coating and thereby reducing the chemical resistance, the grease and oil resistance, and the water vapor and gas impermeability in that region of the coating which has thus been cracked open. This lack of flexibility, crease resistance and scoreability is of particular concern with respect to the use of these resins as coatings for heavier substrates, such as bleached food board, which would be more prone to crack as compared with lighter, more inherently flexible substrates which, although they were capable of cracking, would not, of course, crack as easily.

In attempting to overcome this problem of poor flexibility, use was made of various flexible coating resins

2 which were applied to the substrates as so called "precoats" prior to the later deposition of the vinylidene chloride resin coating. Thus, the use of these soft, flexible precoat resin films was found to effectively minimize the inherent lack of flexibility of vinylidene chloride resin coatings. Their use, however, introduced still another problem for the practitioner. This new problem resulted from the pronounced tendency on the part of the majority of the resins which were utilized as precoats to block or stick, especially under conditions of high temperature and/or high humidity or upon the application of pressure. This tackiness, on the part of these resins, causes the substrates to which they have been applied to stick to themselves and to one another as well as to other surfaces with which they come into contact and thus the practitioner is presented with many difficulties relating to the handling and storage of such coated substrates prior to their subsequent coating with a vinylidene chloride resin.

In addition to the above described problems resulting from the inherent lack of flexibility displayed by vinylidene chloride coatings, their use has also had to be curtailed for still another reason. This latter factor involves the tendency of vinylidene chloride coating resins to excessively penetrate and thereby completely impregnate the cellulosic substrates to which they have been applied. This excessive penetration is, of course, most undesirable inasmuch as it ordinarily serves no useful function and leads to a considerable economic loss. Lesser amounts of resin would, of course, be required to coat any given substrate if the entire quantity of resin could be kept on the surface. Excessive penetration on the part of these vinylidene chloride coating resins is particularly troublesome when these resins are applied in the form of aqueous emulsions or latices and is, moreover, especially evident when, as might be expected, they are used for the coating of more porous substrates such as paper.

In order to be able to eliminate or minimize such excessive penetration on the part of vinylidene chloride resins, the practitioner has again resorted to the use of precoat resins. Although the use of precoats was, indeed, found to be successful for this purpose, their presence again led to the identical handling problems relating to their inherent tackiness as was noted above in connection with the discussion of the use of such precoats as a means for increasing the flexibility of vinylidene chloride coatings.

From the above discussion, it is evident that the use of these otherwise highly desirable vinylidene chloride coating resins is being curtailed primarily for want of a precoat resin system which is devoid of any tendency to block.

In our copending patent application, entitled, "Improved Resin Coatings," Serial No. 196,587, filed May 22, 1962, and now abandoned and assigned to the assignee of the subject application, there is disclosed a novel film forming composition which makes possible the preparation of non-blocking coatings from a class of polymers whose films had heretofore always been characterized by their undesirable tackiness. These novel film forming compositions comprise, in brief, either aqueous emulsions or organic solvent lacquers of certain polymers to which have been added intact granule starch solids.

We have discovered that the starch-resin coating derived from these novel film forming compositions may, as a result of their inherent freedom from blocking, be successfully employed as precoats for the substrates to which vinylidene chloride coatings resins may subsequently be applied.

The fact that these starch-resin coatings can be utilized as precoats for vinylidene chloride resins is most surprising in view of the fact that it is rather unusual to be able to eliminate blocking in a film forming resin without detrimentally effecting its flexibility and softness. That these particular starch-resin compositions are able to attain this combination of properties is most fortunate since these two properties are, of course, the two prime prerequisites necessary for any resins which are to be used as precoats for vinylidene chloride coating resins. The precoat compositions are, moreover, extremely effective in preventing excessive penetration of the vinylidene chloride coating resins into the substrate being coated. It may also be mentioned, at this point, that these starch-resin precoats have no adverse effects upon the heat sealability of the vinylidene chloride coating resins. Thus, our vinylidene chloride coatings may, if desired, be adhesively activated by the application of heat, this property being, of course, of particular utility in the packaging field.

As is described in the above noted copending application, these starch-resin forming compositions comprise the mixtures resulting from the addition of intact granule starches, i.e. ungelatinized starches, to the aqueous emulsions or organic solvent lacquers of vinyl acetate homopolymers; vinyl acetate:alkyl acrylate ester copolymers; alkyl acrylate ester homopolymers; copolymers of two or more alkyl acrylate esters; styrene:butadiene copolymers; and, butadiene:acrylonitrile copolymers.

The intact granule starches which may be added to these resins in order to prepare these novel precoat compositions may be derived from a variety of starch bearing plant sources such as corn, rice, potato, tapioca, sago, wheat, waxy maize, sorghum, waxy sorghum, high amylose corn and sweet potato. Also applicable are the amylose and amylopectin fractions which may be separated from any of the latter raw starch bases. Moreover, if desired by the practitioner, it is possible to employ chemically derivatized starches, such as ethers and esters, as well as various starch conversion products, such as dextrines, fluidity and thin boiling starches, which may be prepared from starches derived from any of the above noted plant sources.

In effect, it is thus seen that one may use any starch, starch derivative, or starch conversion product in the process of our invention provided that these starches retain an intact granule structure, i.e. they have not been gelatinized or otherwise have undergone any physical and/or chemical treatment which has effected a disruption of their original intact granule structure. This limitation is significant since it has been found that when attempts are made to reduce the blocking tendencies of film forming resins by means of formulation with starches which are pregelatinized or otherwise devoid of their intact granule structure, the results have been entirely unsatisfactory. Thus, the films and coatings derived from such formulations are found to be rather hard and brittle and are therefore weaker, less flexible and lacking in crease resistance and scoreability as compared with the properties of the films prepared with intact granule starches. Another limiting factor relating to the use of such pregelatinized starches involves the fact that when present in concentrations above about 10%, by weight of the total resin solids, the resulting formulations cannot be used since they are exceedingly thick and viscous and therefore inoperable with ordinary coating apparatus. Thus, since they must be used at very low concentrations, their effectiveness in reducing blocking is severely curtailed. In addition, it should also be mentioned, at this time, that high concentrations of pregelatinized starches have been found to have an adverse effect upon the stability of many film forming resins.

A further requisite of the starches to be utilized in our process is that they should be admixed with the resin emulsions or lacquers in a granule size which should range from about 3 to 100 microns in diameter. We have, however, found that within this particular granule size range, greater reductions in blocking are apparently obtained by the use of starches having a somewhat larger granule size as compared with the reductions obtained with starches having a smaller granule size.

With respect to proportions, we have found that these starch-resin precoat compositions may contain as little as about 1.0% of intact granule starch solids, as based upon the weight of the dry resin solids present within the emulsion or lacquer. The precise amount of starch solids which is added will, of course, be dependent upon the properties desired in the final precoat film with concentrations as high as 200% being, for example, suitable under certain conditions. It is thus a simple matter to determine the starch concentration which will be optimum for this particular application.

Further details relating to the actual preparation, application, and drying of these novel starch-resin precoat compositions will be found in the above noted copending application.

As for the vinylidene chloride coating resins whose use as topcoats for the above described starch-resin precoat compositions comprises the essence of our invention, these may be selected from any of the three classes of resins hereinafter described.

*Class I.*—This class comprises copolymers of vinylidene chloride containing 85–95%, by weight of vinylidene chloride with from 5–15%, by weight, of a comonomer selected from the group consisting of: vinyl esters of carboxylic acids wherein said acids contain from 2–18 carbon atoms; alkyl esters of acrylic or methacrylic acid wherein said alkyl group may contain from 1–18 carbon atoms; acrylonitrile; acrylamide; methacrylonitrile; vinyl chloride; dialkyl esters of unsaturated dicarboxylic acids wherein said alkyl group may contain from 1–8 carbon atoms; styrene; divinyl ethers; isoprene; alkyl vinyl ketones wherein said alkyl group may contain from 1–8 carbon atoms; and butadiene.

*Class II.*—This class comprises polymers of vinylidene chloride containing 85–95%, by weight, of vinylidene chloride with from 5–15%, by weight, of a combination of any two or more of the comonomers listed in Class I.

*Class III.*—This class comprises polymers of vinylidene chloride containing 85–95%, by weight, of vinylidene chloride with from 5–15%, by weight, of any one or more of the comonomers listed in Class I and from 0.25–5.0%, by weight, of a carboxyl containing monomer selected from the class consisting of acrylic acid, methacrylic acid, fumaric acid, crotonic acid, citraconic acid, itaconic acid, maleic acid, mono-alkyl esters (i.e., acid esters) of maleic acid wherein said alkyl group may contain from 1 to 8 carbon atoms, and acid salts of maleic acid.

Any of the above listed vinylidene chloride resins may be readily prepared by means of various polymerization techniques well known to those skilled in the art. Preferably, these resins may be used, in the process of our invention, in the form of an aqueous emulsion system. However, where desired, these resins may also be utilized in the form of organic solvent solutions (i.e. lacquers) as well as in solid phase systems. Of particular interest for use as a vinylidene chloride coating resin, is an aqueous emulsion of a vinylidene chloride terpolymer which ordinarily contains from 85–95%, by weight, of vinylidene chloride, from 5–15%, by weight, of ethyl acrylate and from 0.25–3.0%, by weight, of fumaric acid.

The actual application of these vinylidene chloride resins atop of the starch-resin precoats may be accomplished by the use of any technique which is capable of depositing a continuous resin film upon the surface of the respective substrate having the precoat film previously applied thereon. Thus, preferred procedures for the deposition of aqueous emulsion systems of any of the above described vinylidene chloride resins are the air knife, wire wound rod, grooved rod, reverse roll and trailing blade coating techniques. Curtain coaters are also effective and, while gravure, offset gravure and roll coaters are less efficient, they may also be used where desired by the practitioner. In many cases, optimum results may be obtained by the application of two lightweight coatings rather than by the use of only one heavier coating. It should be noted that these vinylidene chloride resins provide coatings which are non-blocking on exposure to the drying and finishing operations normally encountered with the equipment used to manufacture and coat paper. These compositions also display excellent stability under the varying conditions of mechanical handling which are employed in connection with the high speed coating apparatus prevalent in the paper industry.

The coating weight required to form continuous films from these vinylidene chloride resin emulsions will vary from about 4–14 pounds of resin solids per 3000 square feet of substrate being coated with optimum coatings being obtained with coating weights of from 8 to 12 pounds per 3000 square feet. At this preferred coating weight range the thickness of the dry films will vary from about 0.3 to 0.4 mil.

Where aqueous emulsion systems of these vinylidene chloride resins are employed, the practitioner may, if desired, introduce inert materials, including pigments and fillers such as titanium dioxide and clay into these emulsion systems. These inert materials may be added in amounts of up to 90% of the final coating weight. However, as the concentration of these fillers is increased, the desired functional properties of the resulting coatings are, in turn, reduced.

These vinylidene chloride resins may be dried by the use of forced air oven drying, infra-red or radiant heat drying. Here again such drying methods are well known and the practitioner may employ the drying means best suited to his particular needs in light of the equipment which is available.

The coatings or laminates of our invention, comprising vinylidene chloride resin topcoats in combination with starch-resin precoats, may be applied to a wide variety of cellulosic substrates such as paper, paperboard, corrugated board, and wood. They may also be applied to other materials such as leather and asbestos as well as to self-supporting films such as those derived from cellophane, polyethylene, polystyrene, polyvinyl chloride, polypropylene, or polyethylene terephthalate.

It should again be emphasized at this point that the novel products of our invention comprise the laminated structures resulting from the application of vinylidene chloride resins to substrates which have previously been coated with starch-resin precoats. The latter precoats, as noted earlier, are being claimed, per se, in our copending application.

The following examples will further illustrate the embodiment of our invention. In these examples, all parts given are by weight unless unless otherwise noted.

*Example I*

This example illustrates the preparation of laminates comprising vinylidene chloride resins applied to substrates which had previously been coated with starch-resin precoats. In this case, the precoats were applied in the form of aqueous resin emulsions containing the intact granule starches admixed therein. The vinylidene chloride coating resin was a terpolymer which was also applied in the form of an aqueous emulsion. It will be noted that the resulting laminates were exceedingly flexible in comparison with comparable vinylidene chloride resin coatings which were applied to the identical substrates which were not, however, coated with the starch-resin precoats. Also demonstrated, in this example, is the remarkable freedom from blocking exhibited by these precoats in comparison with coatings derived from these same precoat resins when the latter were used without prior formulation with intact granule starch solids.

In preparing these starch-resin precoats, the procedure utilized, in each case, involved the formation of a preslurry containing equal parts, by weight, of water, resin solids and the dry, intact granule starch solids. To this pre-slurry, there was then added the bulk of the resin emulsion, the concentration of which was varied so as to provide the resulting mixture with a final desired starch content which, as will be noted, ranged as high as 200%, as based upon the weight of the dry resin solids.

These starch-resin compositions were then applied to 20 pt. bleached kraft board using a #8 wire wound rod so that the ultimate dried coatings had a coating weight of 6 pounds of starch-resin solids per 3,000 square feet of substrate.

The blocking characteristics of these precoated samples were then evaluated by placing two 2" x 2" pieces of the coated board into a face-to-back relationship with each other, i.e., the coated surface of one piece was in contact with the uncoated surface of the other piece. Two 500 gram weights were then placed one atop the other, on the uppermost surface of the two stacked samples and the resulting assembly was then placed into a test chamber which was maintained at a temperature of 60° C. and a relative humidity of 80%. As will be noted, the samples remained under these conditions for periods which varied between 24–90 hours. Upon being removed from the test chamber, the extent to which blocking had occurred was determined by noting the degree with which the two samples adhered to each other. Thus, where blocking was entirely absent, the two samples were completely unadhered. On the other hand, blocking was indicated by the adhesion of the samples, with severe blocking actually resulting in a tearing of the sample's fibers when an attempt was made to effect their separation.

In evaluating the results of these blocking tests, the following descriptions were used: "None"—indicating a complete absence of blocking; "Slight"—indicating a very slight degree of tackiness between the samples; "Bad"—indicating the presence of a few spots between the samples which adhered to each other resulting in a tearing of fibers at these spots when the samples were separated from one another; "Extremely Severe"—indicating a complete surface-to-surface adhesion betwen the two samples resulting in a complete tearing of the fibers along the entire surface of both samples when the latter were separated from one another.

In completing the preparation of the laminates of our invention, additional samples of the above described precoated substrates were then coated with an aqueous resin emulsion containing 50%, by weight, of a 90:9:1 vinylidene chloride:ethyl acrylate:fumaric acid terpolymer which was applied using a #12 wire wound rod so that the ultimate dried coatings had a coating weight of 10 pounds of vinylidene chloride resin solids per 3,000 square feet of substrate. During the application of this terpolymer, it was noted that the presence of the precoat prevented any excessive penetration of the resin emulsion into the body of the substrate.

In evaluating the flexibility of the resulting laminates, we utilized a test of their impact resistance, the latter factor being intimately related to their flexibility as well as their scoreability and crease resistance.

The impact resistance of these laminates was tested by employing a 12" long, 3 mm. wide steel rod having a 200 gram weight placed atop its upper end. This weighted rod was thereupon dropped upon the vinylidene chloride resin coated surface of the sample from various heights and, following a series of drops, the indented surfaces of the tested samples were thereupon brush coated with turpentine containing a red dye. This dyed turpentine was prepared in accordance with TAPPI (Technical Association of the Pulp and Paper Industry) Standard T–454–M–60. After 30 seconds a paper towel was used to remove the excess turpentine from the samples being tested. By utilizing the dyed turpentine, in this manner, it was possible to determine which of the rod impacts had broken through the vinylidene chloride resin coating. This was possible since those indentations which had broken through the resin topcoat were marked, by the dye, with a deep red color whereas those indentations which had not broken through the coating did not have this deep coloration. In reporting the results of this test, the figures given represent the maximum height from which the rod was dropped so as to have caused breaks in the coating on 30%, or less, of the total number of drops. Thus, the impact resistance of the vinylidene chloride resin coatings is seen to be in a direct relationship to the figure, in inches, which is given for the result of the impact resistance test, i.e. a higher figure indicates better impact resistance.

The following table presents all of the data relating to the starch-resin precoat compositions which were utilized for these laminates and also gives the results of the above described precoat block tests and the topcoat impact resistance tests which were run on these samples. As mentioned earlier, the topcoats on each of these precoated samples was derived from the above described 90:9:1 vinylidene chloride:ethyl acrylate:fumaric acid terpolymer. It should also be noted that these laminates displayed an outstanding degree of oil grease and chemical resistance along with excellent vapor and gas impermeability.

| Number | Contents of Starch-Resin Precoat Mixture | | | Hrs. in Block Test | Blocking Evaluation of Precoat | Impact Resistance (in inches) |
|---|---|---|---|---|---|---|
| | Resin Emulsion | Starch [1] | Percent Starch on Dry Resin | | | |
| 1 | None | None (no precoat) | | | | 0.5 |
| 2 | A 50:50 butyl acrylate:vinyl acetate copolymer. | None | | 24 | Extremely severe | 2.0 |
| 3 | do | The ether formed by reacting corn starch with epichlorohydrin (hereinafter referred to as "Corn Starch Ether"). | 30 | 90 | None | 2.0 |
| 4 | do | Rice starch | 50 | 90 | do | 1.5 |
| 5 | do | Corn starch | 30 | 90 | do | 2.0 |
| 6 | do | Potato starch | 30 | 90 | do | 1.5 |
| 7 | do | A corn starch acetate ester | 30 | 67 | do | 2.5 |
| 8 | do | Rice starch | 15 | 90 | Slight | 2.0 |
| 9 | do | Corn starch | 15 | 90 | do | 2.0 |
| 10 | do | Potato starch | 15 | 90 | do | 2.0 |
| 11 | do | Corn starch ether | 15 | 90 | do | 2.0 |
| 12 | do | Rice starch | 1 | 90 | Bad | 2.0 |
| 13 | do | Corn starch | 1 | 90 | do | 2.0 |
| 14 | do | Potato starch | 1 | 90 | do | 2.0 |
| 15 | do | Corn starch ether | 1 | 90 | do | 2.0 |
| 16 | A 60:40 styrene butadiene copolymer | None | | 24 | do | 4.0 |
| 17 | do | Corn starch ether | 10 | 24 | None | 4.0 |
| 18 | do | do | 20 | 24 | do | 3.0 |
| 19 | do | do | 30 | 67 | do | 4.0 |
| 20 | do | do | 40 | 24 | do | 3.0 |
| 21 | do | do | 60 | 24 | do | 2.0 |
| 22 | do | do | 200 | 24 | do | 2.0 |
| 23 | do | Rice starch | 50 | 90 | do | 3.0 |
| 24 | do | An enzyme converted corn starch | 30 | 90 | do | 4.5 |
| 25 | do | A corn starch acid converted to a degree known in the trade as 75 fluidity. | 30 | 90 | do | 4.0 |
| 26 | do | Corn dextrin | 30 | 90 | do | 4.0 |
| 27 | do | Amylopectin | 30 | 90 | do | 3.5 |
| 28 | do | A high amylose starch (containing 75% amylose). | 30 | 90 | do | 4.0 |
| 29 | do | Amylose | 27 | 90 | do | 3.5 |
| 30 | do | A hydroxyethyl ether of corn dextrin | 30 | 67 | do | 3.5 |
| 31 | do | A hydroxyethyl ether of corn starch | 30 | 67 | do | 4.0 |
| 32 | do | An oxidized starch prepared by treating corn starch with sodium hypochlorite. | 30 | 67 | do | 4.0 |
| 33 | do | Rice starch | 15 | 67 | do | 4.0 |
| 34 | do | Corn starch | 15 | 67 | do | 4.0 |
| 35 | do | Potato starch | 15 | 67 | do | 4.0 |
| 36 | do | Corn starch ether | 15 | 67 | do | 4.0 |
| 37 | do | Rice starch | 1 | 67 | Bad | 4.0 |
| 38 | do | Corn starch | 1 | 67 | Slight | 4.0 |
| 39 | do | Potato starch | 1 | 67 | do | 4.0 |
| 40 | do | Corn starch ether | 1 | 67 | do | 4.0 |
| 41 | A polyethyl acrylate homopolymer | None | | 24 | Extremely severe | 3.0 |
| 42 | do | Corn starch ether | 30 | 67 | Slight | 2.0 |
| 43 | do | Rice starch | 50 | 67 | do | 2.0 |
| 44 | A polyvinyl acetate homopolymer | None | | 24 | Bad | 2.0 |
| 45 | do | Corn starch ether | 30 | 67 | Slight | 2.0 |
| 46 | do | Rice starch | 50 | 67 | do | 2.0 |
| 47 | A 70:30 butadiene:acrylonitrile copolymer. | None | | 32 | Bad | 3.0 |
| 48 | do | Corn starch ether | 30 | 32 | None | 3.0 |

[1] All of the above noted starches had a particle size in the range of from 3-100 microns.

Below are listed additional vinylidene chloride resin compositions which were utilized as topcoats in conjunction with our starch-resin precoats in the preparation of additional laminates representative of the process of our invention. The resins were applied by means of the above described procedure and the resulting laminates were all characterized by their excellent impact resistance along with their outstanding oil, grease and chemical resistance together with their impermeability to water vapor and gases.

(1) An aqueous emulsion of a 90:10 vinylidene chloride:vinyl acetate copolymer having a resin solids content of 45%, by weight.

(2) An aqueous emulsion of a 90:10 vinylidene chloride:ethyl acrylate copolymer having a resin solids content of 48%, by weight.

(3) An aqueous emulsion of an 85:5:10 vinylidene chloride:acrylonitrile:styrene terpolymer having a resin solids content of 43%, by weight.

(4) A 20%, by weight, methyl ethyl ketone solution of a 94:6 vinylidene chloride:acrylonitrile copolymer.

(5) A 20%, by weight, solution of a 92.5:7:0.5 vinylidene chloride:ethyl acrylate:fumaric acid terpolymer in a 3:2 mixture of methyl ethyl ketone and toluene.

(6) A 20%, by weight, solution of a 90:10 vinylidene chloride:vinyl acetate copolymer in a 3:2 mixture of methyl ethyl ketone and toluene.

(7) A 20%, by weight, solution of a 90:10 vinylidene chloride:ethyl acrylate copolymer in a 3:2 mixture of methyl ethyl ketone and toluene.

(8) A 20%, by weight, solution of an 85:5:10 vinylidene chloride:acrylonitrile:styrene terpolymer in a 3:2 mixture of methyl ethyl ketone and toluene.

*Example II*

This example illustrates the preparation of laminates comprising vinylidene chloride resins applied to substrates which had previously been coated with starch-resin precoats. In this case, the precoats were applied in the form of organic solvent resin solutions containing the intact granule starches admixed therein while the vinylidene chloride coating resin was the same aqueous emulsion terpolymer as described in Example I, i.e. a 90:9:1 vinylidene chloride:ethyl acrylate:fumaric acid terpolymer.

In preparing the precoats for these laminates, the procedure utilized, in each case, involved the addition of the dry, intact granule starch solids to the precoat resin lacquer. These starch-resin precoat compositions were then applied to 20 pt. bleached kraft board using a #8 wire wound rod so that the ultimate dried coatings had a coating weight of 6 pounds of starch-resin solids per 3,000 square feet of substrate.

To the thus precoated samples, we then applied the vinylidene chloride terpolymer emulsion using a #12 wire wound rod so that the ultimate dried coatings had a coating weight of 10 pounds of vinylidene chloride resin solids per 3,000 square feet of substrate. The absence of any penetration of this resin into the various substrates was again noted.

The following table presents all of the data relating to the composition of the various starch-resin mixtures which were used as precoats for these laminates. It should again be noted that the resulting precoats were completely devoid of any severe blocking tendencies and the resulting laminates displayed excellent impact resistance. Moreover, these laminates also exhibited an outstanding degree of grease, oil and chemical resistance along with excellent water vapor and gas impermeability.

| No. | Resin Lacquer | Starch | Percent Starch on Dry Resin |
|---|---|---|---|
| 1 | A polyvinyl acetate homopolymer in acetone. | Corn starch ether | 20 |
| 2 | do | Corn starch acetate ester | 20 |
| 3 | do | Corn starch | 20 |
| 4 | do | Potato starch | 20 |
| 5 | do | Tapioca starch | 20 |
| 6 | do | Rice starch | 20 |
| 7 | do | Corn dextrin | 20 |
| 8 | do | Amylose | 20 |
| 9 | do | Amylopectin | 20 |
| 10 | do | High amylose starch (contg. 75% amylose). | 20 |
| 11 | A 50:50 vinyl acetate: octyl acrylate copolymer in toluene. | Corn starch ether | 20 |
| 12 | do | Corn starch acetate ester | 20 |
| 13 | do | Corn starch | 20 |
| 14 | do | Potato starch | 20 |
| 15 | do | Tapioca starch | 20 |
| 16 | do | Rice starch | 20 |
| 17 | do | Corn dextrin | 20 |
| 18 | do | Amylose | 10 |
| 19 | do | Amylopectin | 20 |
| 20 | do | High amylose starch (contg. 75% amylose). | 20 |

*Example III*

This example illustrates the unsuccessful use of pregelatinized starches in attempting to prepare the starch-resin precoats utilized in the process of our invention and thus serves to point out the criticality involved in the use of intact granule starches.

Following the procedure described in Example I, we prepared a starch-resin composition comprising a 60s40 styrene:butadiene aqueous copolymer emulsion containing, in this case, 30%, as based on the weight of the copolymer resin solids, of a pregelatinized corn starch. However, the resulting formulation was found to be exceedingly thick and viscous and could not, therefore, be applied by the use of the #8 wire wound rod which was, of course, successfully employed for the application of all of the various starch-resin formulations whose use was described in Example I.

Summarizing, our invention is thus seen to provide a means for allowing the practitioner to more fully utilize vinylidene chloride coating resins by providing a non-blocking precoat system which prevents any excessive penetration of these coatings resins into their respective substrates and also imparts a necessary degree of flexibility to the resulting coated substrates. Variations may be made in proportions, procedures, and materials without departing from the scope of our invention as defined by the following claims.

We claim:

1. An article comprising a substrate coated with two layers, the lower layer of said article which is in contact with said substrate comprises a dried, consolidated, non-blocking film consisting of a mixture of a film forming polymer and intact granule starch solids having a granule size within the range of from about 3 to 100 microns in diameter; and the upper layers of said article comprises a dried, consolidated film consisting of a vinylidene chloride resin, said lower layer being adhesively bound to both the substrate and to said upper layer.

2. The article of claim 1, wherein the film forming polymer of said lower layer is a polymer selected from among the group consisting of homopolymers of vinyl acetate; copolymers of vinyl acetate with at least one alkyl acrylate ester, homopolymers of alkyl acrylate esters; copolymers of at least two alkyl acrylate esters; copolymers of styrene and butadiene; and copoylmers of butadiene and acrylonitrile.

3. The layer of claim 1, wherein the vinylidene chloride resin of said upper layer is selected from among the following groups of resins consisting of:

(A) Copolymers of vinylidene chloride with from 5–15%, by weight, of at least one comonomer selected from the group consisting of vinyl esters of carboxylic acids wherein said acids contain from 2–18 carbon atoms, alkyl esters of acrylic and methacrylic acid wherein said alkyl groups contain from 1–18 carbon atoms, acrylonitrile, acrylamide, methacrylonitrile, vinyl chloride, dialkyl esters of unsaturated dicarboxylic acids wherein said alkyl groups contain from 1–8 carbon atoms, styrene, divinyl ethers, isoprene, alkyl vinyl ketones wherein said alkyl groups may contain from 1–8 carbon atoms, and butadiene, and (B) Copolymers of vinylidene chloride containing 85–95%, by weight, of vinylidene chloride with from 5–15%, by weight, of at least one comonomer selected from the group consisting of vinyl esters of carboxylic acids wherein said acids contain from 2–18 carbon atoms, alkyl esters of acrylic and methacrylic acid wherein said alkyl groups contain from 1–18 carbon atoms, acrylonitrile, acrylamide, methacrylonitrile, vinyl chloride, dialkyl esters of unsaturated dicarboxylic acids wherein said alkyl groups contain from 1–8 carbon atoms, styrene, divinyl ethers, isoprene alkyl vinyl ketones wherein said alkyl groups contain from 1–8 carbon atoms, and butadiene; and, from 0.25;5.0%, by weight, of a carboxyl containing monomer selected from the class consisting of acrylic acid, methacrylic acid, fumaric acid, crotonic acid, itaconic acid, citraconic acid, maleic acid, mono-alkyl esters of maleic acid wherein said alkyl groups contain from 1–8 carbon atoms, and acid salts of maleic acid.

4. An article comprising a substrate coated with two layers, the lower layer of said article which is in contact with said substrate comprises a dried, consolidated, non-blocking film consisting of a mixture of a film forming polymer and intact granular starch solids having a granule size within the range of from about 3 to 100 microns in diameter; and the upper layer of said article comprises a dried, consolidated film consisting of the dried residue of an aqueous emulsion of a vinylidene chloride terpolymer containing, on a weight basis, from 85–95% of vinylidene chloride, from 5–15% of ethyl acrylate, and from 0.25–3.0% of fumaric acid, said lower layer being adhesively bound to both the substrate and to said upper layer.

5. The article of claim 4, wherein the film forming polymer of said lower layer is a polymer selected from among the group consisting of homopolymers of vinyl acetate; copolymers of vinyl acetate with at least one alkyl acrylate ester, homopolymers of alkyl acrylate esters; copolymers of at least two alkyl acrylate esters; copolymers of styrene and butadiene; and, copolymers of butadiene and acrylonitrile.

References Cited by the Examiner

UNITED STATES PATENTS

| | | | |
|---|---|---|---|
| 2,102,937 | 12/1937 | Bauer | 156—292 XR |
| 2,613,160 | 10/1952 | Walton et al. | 260—40 X |
| 2,824,023 | 2/1958 | Banigan | 260—17.4 X |
| 2,971,857 | 2/1961 | Baxter | 117—10 |
| 2,996,462 | 8/1961 | Robbins | 260—17.4 |
| 3,067,152 | 12/1962 | Fukushima et al. | 260—17.4 |
| 3,095,391 | 6/1963 | Brockway et al. | 260—17.4 |
| 3,137,664 | 6/1964 | Shulman et al. | 260—17.4 |
| 3,162,543 | 12/1964 | Wilkins | 117—76 |

WILLIAM D. MARTIN, *Primary Examiner.*

EARL M. BERGERT, *Examiner.*

L. T. PIRKEY, R. HUSACK, *Assistant Examiners.*